United States Patent
Gauthier et al.

(10) Patent No.: US 7,436,145 B2
(45) Date of Patent: Oct. 14, 2008

(54) METHOD AND APPARATUS FOR CONTROLLING BRUSHLESS DC MOTORS IN IMPLANTABLE MEDICAL DEVICES

(75) Inventors: Raymond G. Gauthier, Folsom, CA (US); David M. Lancisi, Folsom, CA (US); Gregory L. Morris, Rocklin, CA (US)

(73) Assignee: Heartware, Inc., Miramar, FL (US)

( * ) Notice: Subject to any disclaimer, the term of this patent is extended or adjusted under 35 U.S.C. 154(b) by 10 days.

(21) Appl. No.: 11/603,933

(22) Filed: Nov. 21, 2006

(65) Prior Publication Data

US 2007/0252542 A1 Nov. 1, 2007

Related U.S. Application Data

(63) Continuation of application No. 09/349,575, filed on Jul. 8, 1999, now Pat. No. 7,138,776.

(51) Int. Cl.
*G05B 21/02* (2006.01)
(52) U.S. Cl. ............. 318/636; 318/400.01; 318/400.41; 318/400.09; 318/400.14; 318/400.17; 318/609; 318/610; 318/439
(58) Field of Classification Search ............ 318/400.01, 318/400.06, 400.07, 400.14, 400.2, 832, 318/823, 812, 805, 801, 636, 439, 609, 610, 318/811, 400.42, 400.09, 400.17, 400.35, 318/400.34, 400.41
See application file for complete search history.

(56) References Cited

U.S. PATENT DOCUMENTS 4,173,796 A 11/1979 Jarvik (Continued)

FOREIGN PATENT DOCUMENTS

| EP | 0363169 | 4/1990 |
|---|---|---|
| EP | 0602977 | 6/1994 |
| EP | 0892489 | 1/1999 |

OTHER PUBLICATIONS

Opposition filed by Ventracor Limited in Australia Pat. No. 771931, including declarations of P. Skevington, S. Sathiakumar, G.P. Hunter; P.J Ayre and T. Yiu.

(Continued)

*Primary Examiner*—Rita Leykin
(74) *Attorney, Agent, or Firm*—John P. White; Cooper & Dunham LLP (57) ABSTRACT

Methods and apparatus for controlling a polyphase motor in implantable medical device applications are provided. In one embodiment, the polyphase motor is a brushless DC motor. The back emf of a selected phase of the motor is sampled while a drive voltage or the selected phase is substantially zero. Various embodiments utilize sinusoidal or trapezoidal drive voltages. The sampled back emf provides an error signal indicative of the positional error of the rotor. In one embodiment, the sampled back emf is normalized with respect to a commanded angular velocity of the rotor to provide an error signal proportional only to the positional error of the motor rotor. The error signal is provided as feedback to control a frequency of the drive voltage. A speed control generates a speed control signal corresponding to a difference between a commanded angular velocity and an angular velocity inferred from the frequency of the drive voltage. The speed control signal is provided as feedback to control an amplitude of the drive voltage. In one embodiment, an apparatus includes a brushless DC motor and a commutation control. The commutation control provides a commutation control signal for a selected phase of the motor in accordance with a sampled back electromotive force (emf) of that phase. The back emf of the phase is sampled only while the corresponding drive voltage for the selected phase is substantially zero, wherein a frequency of a drive voltage of the motor is varied in accordance with the commutation control signal.

12 Claims, 9 Drawing Sheets

U.S. PATENT DOCUMENTS

| | | | |
|---|---|---|---|
| 4,585,983 A | | 4/1986 | Cooper et al. |
| 4,654,566 A | | 3/1987 | Erdman |
| 4,812,724 A | | 3/1989 | Langer et al. |
| 4,928,043 A | * | 5/1990 | Plunkett ................ 318/400.34 |
| 5,057,753 A | | 10/1991 | Leuthold et al. |
| 5,177,416 A | | 1/1993 | Inaji et al. |
| 5,345,156 A | * | 9/1994 | Moreira ................ 318/400.04 |
| 5,382,889 A | | 1/1995 | Peters et al. |
| 5,384,527 A | * | 1/1995 | Rozman et al. ............... 322/10 |
| 5,420,492 A | | 5/1995 | Sood et al. |
| 5,481,166 A | | 1/1996 | Moreira |
| 5,527,159 A | | 6/1996 | Bozeman, Jr. et al. |
| 5,635,810 A | | 6/1997 | Goel |
| 5,646,491 A | | 7/1997 | Erdman et al. |
| 5,678,306 A | | 10/1997 | Bozeman, Jr. et al. |
| 5,708,337 A | | 1/1998 | Breit et al. |
| 5,711,753 A | | 1/1998 | Pacella et al. |
| 5,747,971 A | * | 5/1998 | Rozman et al. ............... 322/10 |
| 5,751,125 A | | 5/1998 | Weiss |
| 5,780,983 A | | 7/1998 | Shinkawa et al. |
| 5,783,917 A | | 7/1998 | Takekawa |
| 5,783,920 A | | 7/1998 | Hahn |
| 5,789,895 A | | 8/1998 | Lee |
| 5,840,070 A | * | 11/1998 | Wampler ................... 604/131 |
| 5,859,520 A | | 1/1999 | Bourgeois et al. |
| 5,869,944 A | | 2/1999 | Tanina |
| 5,888,242 A | | 3/1999 | Antaki et al. |
| 5,920,162 A | * | 7/1999 | Hanson et al. ......... 318/400.04 |
| 5,929,577 A | | 7/1999 | Neidorff et al. |
| 5,949,203 A | | 9/1999 | Buthker |
| 5,990,643 A | | 11/1999 | Holling et al. |
| 6,015,272 A | * | 1/2000 | Antaki et al. ............... 417/356 |
| 6,080,133 A | * | 6/2000 | Wampler ................... 604/131 |
| 6,120,537 A | * | 9/2000 | Wampler ................... 623/3.14 |
| 6,124,689 A | * | 9/2000 | Kardash ................ 318/400.2 |
| 6,149,683 A | | 11/2000 | Lancisi et al. |
| 6,512,341 B2 | * | 1/2003 | Matsushiro et al. .... 318/400.07 |
| 6,979,970 B2 | * | 12/2005 | Iwanaga et al. ........ 318/400.35 |

OTHER PUBLICATIONS

"Comparative Study of the Design and Development of Direct Drive Brushed and Brushless DC Motors with Samarium Cobalt, Neodymium-Iron-Boron and Ceramic Magnets", S.K. Pal; Muirhead Vactric Components Ltd. (7 pgs; date unknown).

"Literature Survey of Permanent Magnet AC Motors and Drives", P. Pillay et al. Department of Electrical Engineering; University of Newcastle upon Tyne; (1989; pp. 74-84).

"Study of Implementation of Hysterisis Controlled Inverter on a Permanent Magnet Synchronous Machine", M. Lajoie-Mazenc, et al.; (1984; pp. 426-431).

"Direct Digital Control of a Self-Controlled Synchronous Motor with Permanent Magnet", C. Bergmann et al., (date unknown; 5 pgs.).

"Definition of the Brushless DC Motor", A. Kusko et al.; Kusko Electrical Division Failure Analysis Associates, Westborough, PA (1988; pp. 20-22).

"Fast Response Reversible Brushless DC Drive with Regenerative Braking", B. V. Murty, et al.; General Motors Research Laboratories, (1984; pp. 445-450).

"Microcomputer Control for Sensorless Brushless Motor", K. Iizuka et al., Transactions of Industry Applications; vol. IA-21, No. 4, May/Jun. 1985; (pp. 595-601).

"Electronically Commutated DC Motors for the Appliance Industry", D.M. Erdmann et al; General Electric Compnay; (1984; pp. 1339-1345).

"Four Quadrant Sensorless Bruchless ECM Drive"; R.C. Becorra et al.; GE Motors; (1991; pp. 202-209).

"New Approach for the Low-Speed Operation of PMSM Drives Without Rotational Position Sensors"; Joohn-Sheok Kim, et al.; Transactions on Power Electronics, vol. 11, No. 3, May 1996; (pp. 512-519).

"Classification of Inverter Driven Permanent Magnet Synchronous Motors"; R. Colby, Department of Electrical and Computer Engineering, North Carolina State University, (1988; 6 pgs.).

"Brushless DC Motor Propulsion Using Synchronous Motors for Transit Systems"; W. Pearson et al.; Transactions on Industrial Electronics, vol. 1E-31, No. 4. Nov. 1984 (pp. 346-351).

"Position Servo System with PM AC motor Using 80C196 Micro-Controller"; S. Sathiakumar et al.; International Power Engineering Conference 1993; pp. 472-477.

"A Phase-Locked Loop Control System for a Synchronous Motor"; Gerald T. Volpe, Transactions on Automatic Control, vol. AC-15, No. 1; Feb. 1970; pp. 88-95.

"A Super High Speed PM Motor Drive System by a Quasi-Current Source Inverter"; Isao Takahashi, et al. Department of Electrical Engineering, Nagaoka University of Technology; 1993; pp. 657-662.

"A New PWM Speed Control System for High-Performance AC Motor Drives"; P. Enjeti et al.; Transactions on Industrial Electronics, vol. 37, No. 2, Apr. 1990; pp. 143-151.

"Adjustable Speed Drive for Residential Applications"; Mohab Hallouda et al.; Cairo University, Egypt; 1993; pp. 928-934.

"Microprocessor Controlled True SPWM Voltage Source Inverter"; S. Sathiakumer et al.; Department of Electrical Engineering, Indian Institute of Science, India; 1984; pp. 22-25.

"Microprocessor Based Sinusoidal PWM Inverter by DMA Transfer"; K. Rajashekara et al.; Transactions on Industrial Electronics, vol. 1E-29, No. 1; Feb. 1982; pp. 46-51.

"Micro Linear, ML4411*/ML4411A**, Sensorless Spindle Motor Controller", May 1997, 14 pgs.

"Brushless Permanent Magnet and Reluctance Motor Drives"; T.J.E. Miller; Oxford Science Publications; Monographs in Electrical and Electronic Engineering No. 21; 1989; pp. 1-207.

"A Full-Wave Motor Drive IC Based on the Back EMF Sensing Principle"; JPM. Bahlmann; Phillips Consumer Electronics, The Netherlands; 1989; pp. 415-420.

International Preliminary Examination Report issued by the International Preliminary Examining Authority (IPEA/US), dated Jun. 14, 2002 in connection with International Application No. PCT/US2000/040325.

Written Opinion issued by the International Preliminary Examining Authority (IPEA/US) on Aug. 29, 2001 in connection with International Application No. PCT/US2000/040325.

International Search Report issued by the International Searching Authority (ISA/US) on Dec. 13, 2000 in connection with International Application No. PCT/US2000/040325.

* cited by examiner

METHOD AND APPARATUS FOR CONTROLLING BRUSHLESS DC MOTORS IN IMPLANTABLE MEDICAL DEVICES

This application is a continuation of U.S. Ser. No. 09/349,575 filed Jul. 8, 1999 now U.S. Pat. No. 7,138,776, the contents of which are hereby incorporated by reference in their entirety into the present application.

FIELD OF THE INVENTION

This invention relates to the field of implantable medical devices. In particular, this invention is drawn to reducing noise and vibration in motor-driven implantable medical device applications.

BACKGROUND OF THE INVENTION

Implantable medical devices such as ventricular assist devices are being developed for long term treatment of chronic heart failure. Such devices require a pumping mechanism to move blood. Due to the nature of the application, the pumping mechanism must be highly reliable. Patient comfort is also a significant consideration.

Electrically powered pumping mechanisms typically rely on a motor such as a brushless DC motor. Brushless DC motors offer maintenance advantages in implant applications due to the lack of wear-prone brushes and slip rings. Due to the lack of these mechanical commutation components, however, commutation must be provided electrically by the drive electronics. In order to provide proper commutation, the mechanical angle of the motor's rotor must be determined. Typically, speed control is also desired.

One method of motor drive control for three-phase motors is referred to as a six step drive. The six step drive provides a square wave as the drive voltage for each motor phase. One type of six step drive uses a phase-locked loop to generate an error between the rotation speed indicated by the back emf zero crossing frequency and a commanded rotational speed. This error signal is then used to control the motor drive voltage.

Another type of six step drive uses the back emf zero crossing to supply an appropriate delay to a commutation sequencer circuit. This approach typically requires a center tap for each motor winding. The center tap is undesirable in medical implant applications because it introduces additional lead wires that must be routed from the pump to the controller. Both six step drive back emf sensing approaches typically require a phase of the motor to be open-circuited for a large portion of the commutation period and are susceptible to false triggering due to electrical switching noise.

Another disadvantage of six step drive controls is the "on-off" nature of the drive voltage. In a three-phase motor application, for example, the six step drive powers only two phases at a time. The stepping nature of the driving voltage waveform introduces harmonics and electromagnetic noise. Additionally, the stepping nature of the drive voltage results in increased torque-ripple. These effects generate acoustical noise and vibration which are undesirable for medical implant applications.

An alternative motor drive system uses sinusoidal drive voltages for the motor phases. The sinusoidal drive voltage significantly reduces torque ripple resulting in improved acoustical and vibration characteristics. Typically, information about the angular position of the rotor is needed for adequate motor control.

The rotor position information can be indicated by sensors, such as Hall-effect sensors, or through the use of encoders or resolvers. The use of additional sensors in medical implant applications, however, is undesirable as introducing additional cost, complexity, and points of failure for the device. An alternative method samples the state of the motor and infers the position of the rotor from a mathematical model. Disadvantages of this approach include susceptibility to errors in the model, variations in the model due to manufacturing tolerances, and system electrical noise.

SUMMARY OF THE INVENTION

In view of limitations of known systems and methods, methods and apparatus for controlling a polyphase motor in implantable medical device applications are provided. In one embodiment, the polyphase motor is a brushless DC motor. Various implementations utilize sinusoidal or trapezoidal drive voltages. A method includes the step of sampling the back emf of a selected phase of the motor while the drive voltage of the selected phase is substantially zero. In various embodiments, the sampling interval may or may not straddle a zero crossing of the drive voltage for the selected phase. The sampled back emf provides an error signal indicative of the positional error of the rotor. In one embodiment, the sampled back emf is normalized with respect to a commmanded angular velocity of the rotor to provide an error signal proportional only to the positional error of the motor rotor. The error signal is provided as feedback to control a frequency of the drive voltage for commutation control. A speed control generates a speed control signal corresponding to a difference between a commanded angular velocity and angular velocity inferred from the frequency of the drive voltage. The speed control signal is provided as feedback to control an amplitude of the drive voltage.

An apparatus includes a brushless DC motor and commutation control. The commutation control provides a commutation control signal for a selected phase of the motor in accordance with a sampled back emf of that phase. The back emf is sampled only while the corresponding selected phase drive voltage is substantially zero. The frequency of the brushless DC drive voltage is varied in accordance with the commutation control signal. In one embodiment, the back emf is normalized with respect to a commanded rotor angular velocity. A speed control generates a speed control signal corresponding to a difference between a commanded angular velocity and an angular velocity inferred from the frequency of the drive voltage.

Other features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar element and in which.

DETAILED DESCRIPTION

Conventional DC (direct current) motors typically have a field system comprising permanent magnets to establish magnetic flux. A commutator is used to distribute current to a plurality of coils or windings on an armature. The commutator is in contact with a plurality of brushes coupled to a power supply. The commutator ensures that current is distributed to the windings in a manner that creates a torque resulting in rotation of the motor's rotor. As the rotor turns, the commutator changes the current distribution to maintain torque. Generally, the commutation of a conventional DC motor is achieved mechanically through the use of slip rings and brushes.

Brushless DC motors are distinguished from conventional DC motors by the lack of brushes, slip rings, or other mechanical commutators. Commutation for brushless DC motors is provided electronically rather than mechanically. The brushless DC motor is also referred to as a brushless permanent magnet (PM) motor or an AC (alternating current) servo motor. The term "DC" is used to indicate that the speed of the motor is a function of a DC bus voltage before inversion to a drive voltage rather than the frequency of the drive voltage. Typically, permanent magnets are mounted on the motor's rotor and the current carrying windings are formed in the stationary portion of the motor (i.e., the stator). The elimination of brushes and other mechanical components reduces the risk of failure due to the deterioration of these components during normal operation.

One method of providing commutation to a brushless DC motor uses sensors to detect the mechanical angle of the rotor. Resolvers, encoders, and Hall effect sensors are examples of devices used to determine the mechanical angle of the rotor. These devices introduce additional electrical or mechanical components into the motor control system resulting in additional points of failure that are undesirable in medical implant applications.

An alternative method of providing commutation to a brushless PM motor senses the back electromotive force (emf) generated by the motor itself. This technique is referred to as sensorless because no additional sensors are introduced for determining the rotor's position. The back emf serves as feedback for motor control.

The brushless DC motor is typically a polyphase motor. For n phases, the drive voltage comprises n phases, each displaced $$\frac{2\pi}{n}$$

from the adjacent phase. The back emf is a function of the number of phases n, the number of motor poles, and the angular velocity of the rotor. The back emf is typically sinusoidal with a frequency dependent on the angular velocity of the rotor and the motor geometry. The amplitude of the back emf is a function of the angular velocity of the rotor. The back emf for a selected phase is measured by measuring the open-circuit voltage of a selected phase of the motor.

Figure 1:
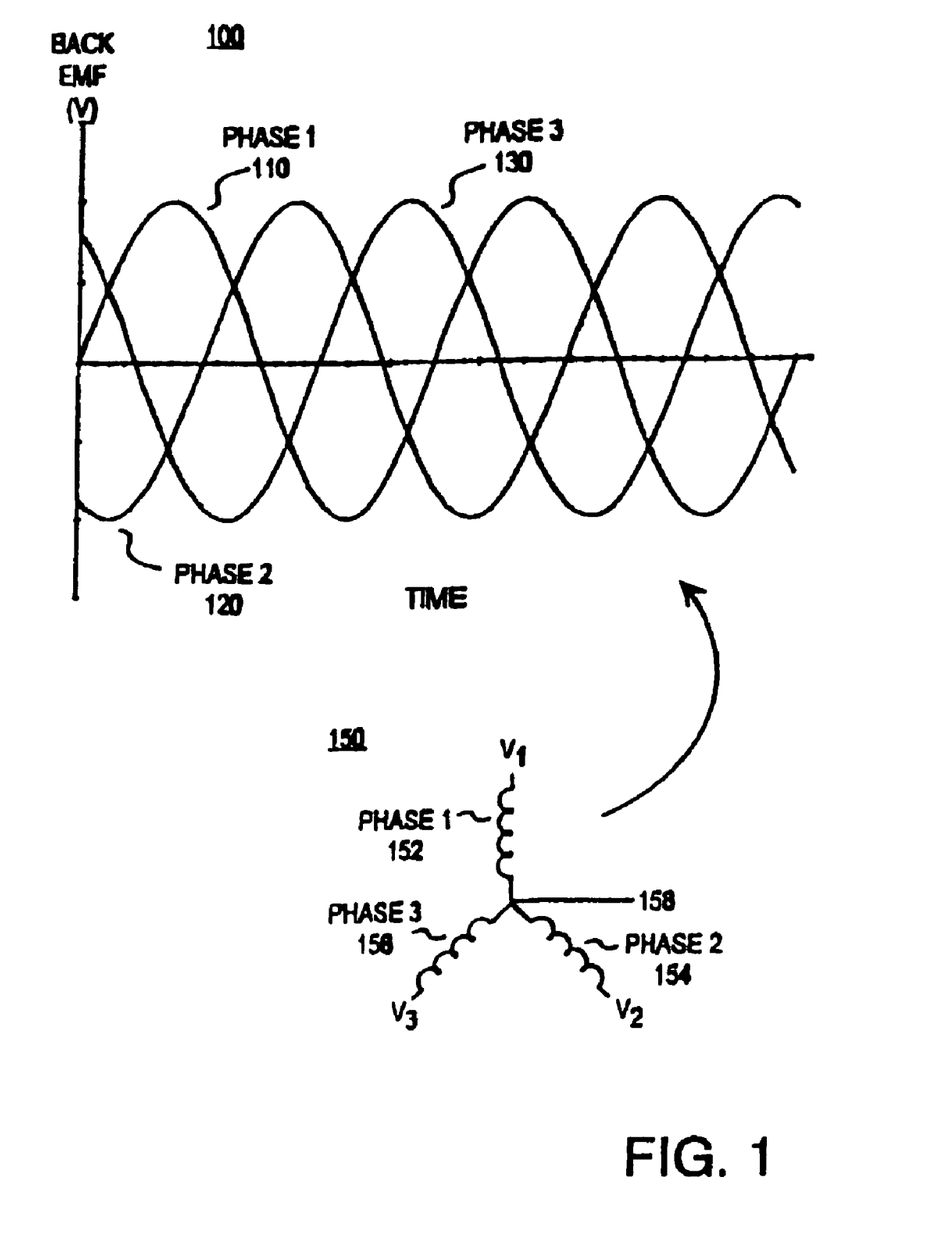
FIG. 1 illustrates back emf voltage for one embodiment of a three phase motor.

FIG. 1 illustrates one embodiment of the back electromotive force (BEMF) generated by a polyphase brushless DC motor. In particular, back emf 100 of a three phase motor 150 is illustrated as multiple sinusoidal waveforms 110, 120, and 130 (120° apart), each corresponding to the back emf of a selected motor phase. The relationship between the electrical angle of a selected phase and the mechanical angle of the rotor is dependent upon motor geometry.

Three phase motor 150 with Wye connected windings is typically modeled as three coils 152, 154, and 156 having a common connection 158. The back emf for each selected phase is measured between the common connection 158 and the other end of the coil (i.e., nodes $V_1$, $V_2$, and $V_3$). Alternatively, the voltage at nodes $V_1$, $V_2$, and $V_3$ can be compared to a reference voltage with a known relationship to the voltage at node 158, instead of sampling directly across the phases 152, 154, and 156. This alternative may be preferable in medical applications so that an additional lead is not required.

Figure 2:
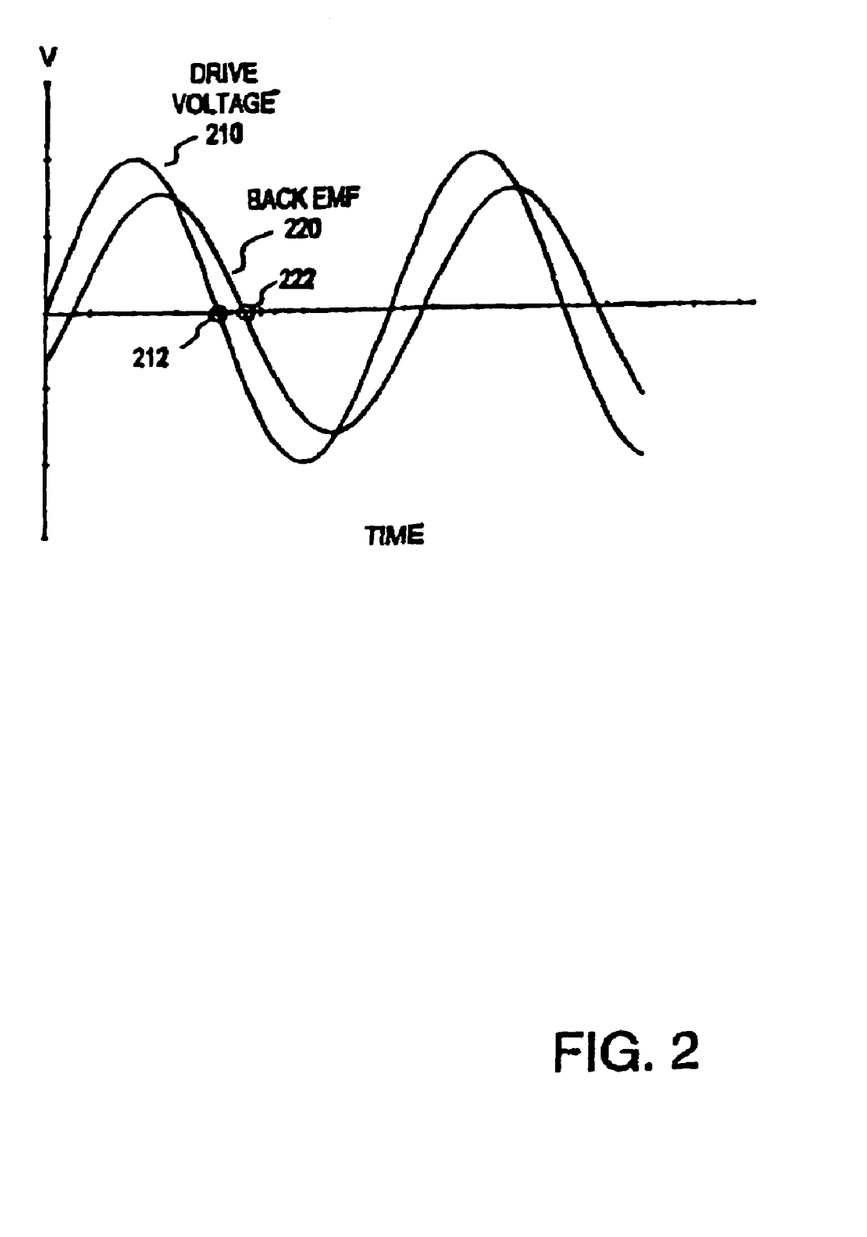
FIG. 2 illustrates a sinusoidal drive voltage on a selected phase of the motor and the corresponding back emf of the selected phase.

In one embodiment, the polyphase brushless DC motor is driven by a multiphase sinusoidal drive voltage. FIG. 2 illustrates the relationship between a sinusoidal drive voltage 210 applied to a selected phase of the motor and the corresponding back emf 220 for that phase. The phase difference between the drive voltage 210 and the back emf 220 is used to control the motor. The "zero crossing" 212 of drive voltage 210 corresponds to the point at which the drive voltage 210 pass through the mean value of the drive voltage or the midpoint of the peak-to-peak drive voltage. The distance or time delay between the drive voltage zero crossing 212 and the back emf zero crossing 222 corresponds to an error between actual rotor position and commanded position and may be used as feedback for controlling the drive voltage of the motor. In one embodiment, the phase error is determined by sampling the value of the back emf 220 when the drive voltage is substantially zero. The phase error is proportional to the back emf for small phase errors. FIG. 2 is intended to illustrate the relationship between the drive voltage and the back emf, and thus the relative amplitudes of the two signals are not necessarily to scale.

Figure 3:
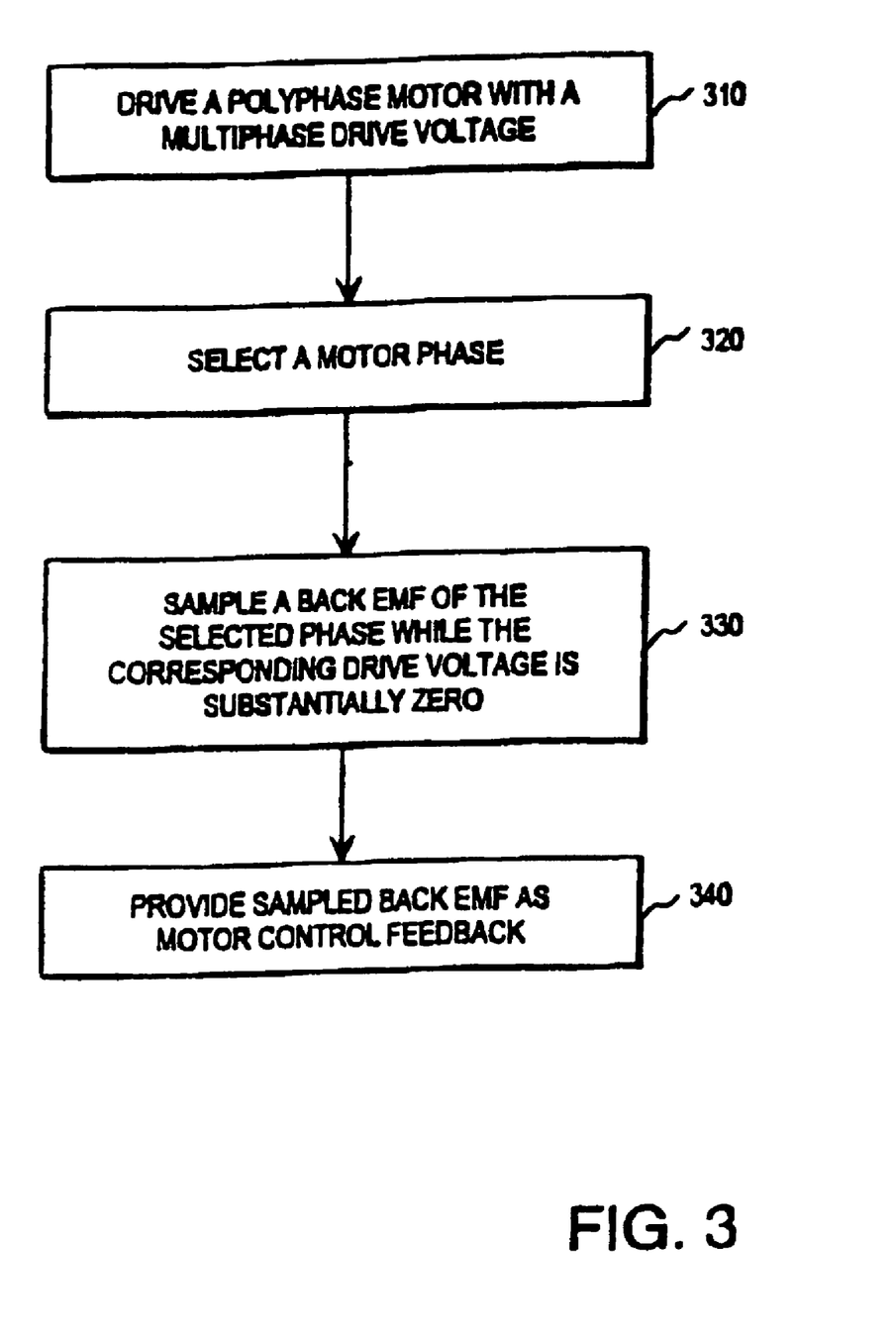
FIG. 3 illustrates one embodiment of a method for controlling a brushless DC motor in accordance with the back emf.

FIG. 3 illustrates a method of measuring the back emf of a polyphase motor. The motor is provided with a multiphase drive voltage as indicated in step 310. A phase of the motor for which the back emf is to be measured is selected in step 320. The open-circuit voltage for the selected phase is measured in step 330 when the drive voltage for the selected phase is substantially zero. When the drive voltage is substantially zero, the phase current contributes negligibly to the open-circuit voltage and any contribution quickly decays such that the back emf of the selected phase is the primary component of the measured open-circuit voltage. Measuring the open-circuit phase voltage when the drive voltage for that phase is substantially zero also reduces torque ripple and inductive current spikes that may otherwise occur due to open circuiting the phase when the drive voltage is not zero. The open-circuit voltage is then provided as a feedback signal for control and commutation of the motor in step 340.

Figure 4:
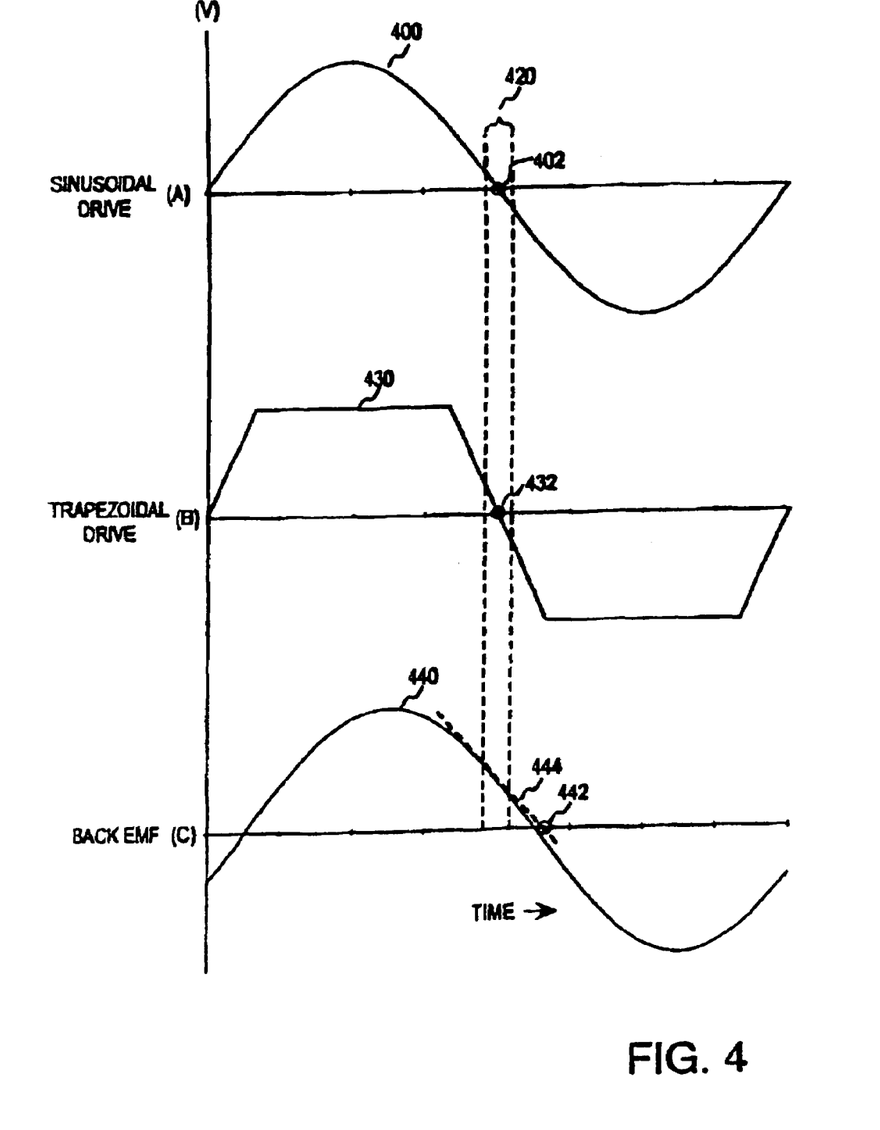
FIG. 4 illustrates a sampling interval with respect to a zero crossing of a selected phase of the drive voltage.

FIG. 4 illustrates one possible location of the sampling interval 420 with respect to the value of the selected phase drive voltage. The location of sampling interval 420 is illustrated with respect to a sinusoidal drive voltage 400 and a trapezoidal drive voltage 430. In one embodiment, the sampling interval 420 includes a zero crossing of the drive voltage. Thus for a sinusoidal drive voltage 400, sampling interval 420 includes a zero crossing such as zero crossing 402. For a trapezoidal drive voltage 430, sampling interval 420 includes a zero crossing such as zero crossing 432.

In one embodiment the sampling interval 420 is substantially symmetrical about a zero crossing of the selected phase drive voltage such that the zero crossing (e.g., 402, 432) occurs at the midpoint of the sampling interval. If the selected phase drive voltage is sinusoidal, the mean of drive voltage 400 over the sampling interval is approximately zero in this case. In alternative embodiments, the sampling interval is asymmetrically located such that the zero crossing does not occur at the midpoint of the sampling interval. The sampling interval is short with respect to the period of the drive voltage.

The phase error can be determined from the sampled back emf 440 in a number of ways. For small phase errors, the back emf may be proportional to the phase error such that the sampled back emf varies with the phase error. Alternatively, the slope 444 of the back emf 440 in conjunction with the value of the back emf 440 during the sampling interval 420 may be used to provide an interpolated back emf zero crossing 442. The distance between the zero crossings (402, 432) of the drive voltage and the interpolated back emf zero crossing 442 provides an estimate of the phase error for feedback control.

Figure 5:
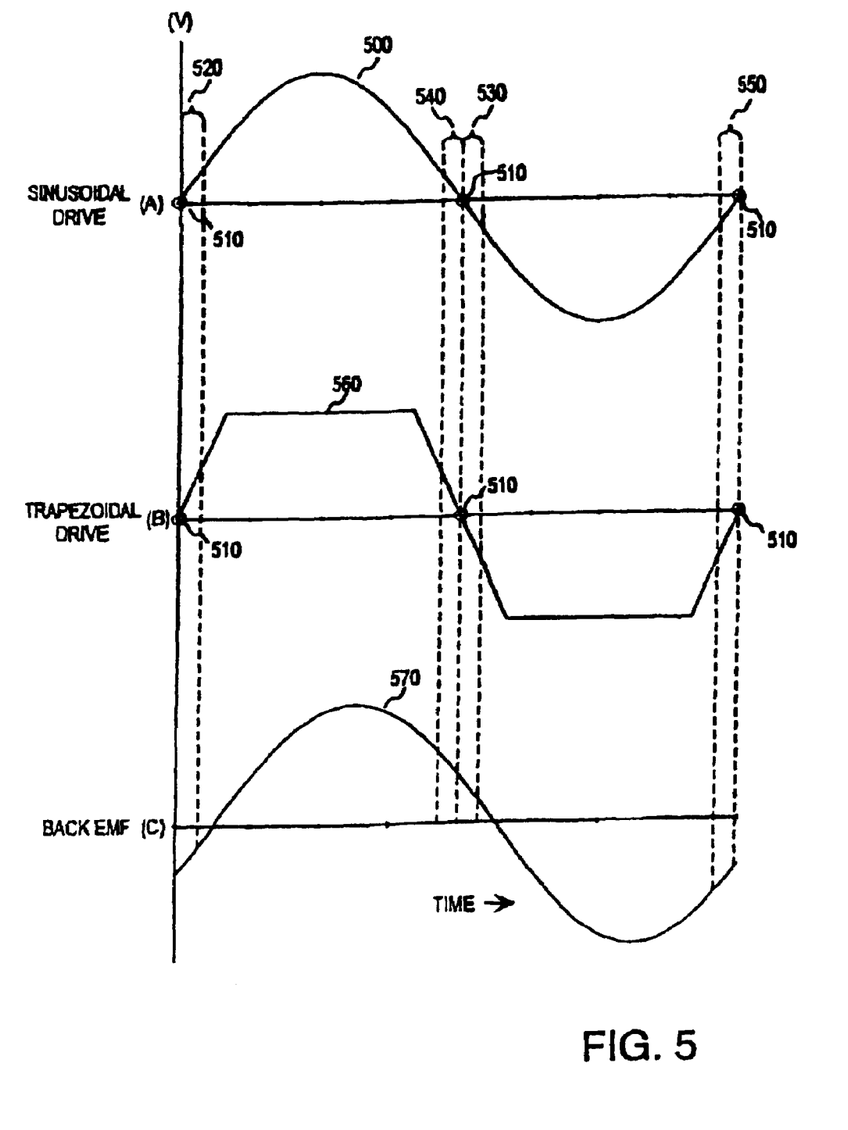
FIG. 5 illustrates alternate locations of sampling intervals with respect to zero crossings of a selected phase of the drive voltage.

FIG. 5 illustrates alternative embodiments for the location of the back emf sampling interval with respect to various drive voltage waveforms including a sinusoidal drive voltage 500 and a trapezoidal drive voltage 560. Sampling interval 520 is initiated when or just after a zero crossing 510 when the slope of the drive voltage 500 or 560 is positive. Sampling interval 550 is initiated just before a zero crossing 510 when the slope of the drive voltage is positive. Sampling interval 540 illustrates a sampling interval initiated just before a zero crossing when the slope of the drive voltage is negative. Sampling interval 530 illustrates a sampling interval initiated just after a zero crossing when the slope of the drive voltage is negative.

The location and frequency of the sampling interval may vary depending upon the requirements of the motor drive control system. For example, FIG. 4 illustrates a sampling interval occurring at a zero crossing when the selected phase drive voltage has a negative slope. Alternatively, the sampling interval may occur at a zero crossing when the selected phase drive voltage has a positive slope. In another embodiment, the sampling interval may occur for each zero crossing such that sampling occurs more frequently than once per cycle of the selected phase's drive voltage.

Regardless of the selected embodiment, the location of the sampling interval is selected to ensure that the value of the drive voltage, V(t), during the sampling interval (T) is significantly smaller than the peak voltage, Vp such that $$\frac{V(T)}{Vp} = 0.$$

In one embodiment, the instantaneous open-circuit voltage is determined. In alternative embodiments, the mean or the integral of the open-circuit voltage during the sampling interval is provided as the sampled back emf.

The sampling interval need not include the zero crossing of the back emf. The zero crossing of the back emf can be inferred, if desired, from either the value of the back emf or a combination of the slope and the value of the back emf measured during the sampling interval. The sampled open-circuit voltage corresponding to the back emf is a function of the angular velocity ($\omega$) of the rotor and the angular position of the rotor (corresponding to a phase difference between the drive voltage and the back emf) as follows:

$$\text{Back EMF} = K_b \omega \sin(A\theta_r)$$

where $K_b$ is a back emf count, $\omega$ is the angular velocity of the rotor, A is the number of rotor pole pairs, and $\theta_r$ is the rotor position. For small angles, the substitution $$\sin(A\theta_r) = A\theta_r$$

results in a simplified expression for the back emf as follows:

$$\text{Back EMF} = K_b \omega A \theta_r$$

In one embodiment, the error signal used for feedback is the sampled back emf such that $$\text{Verror} = \text{Back EMF} = K_b \omega A \theta_r$$

If the back emf is used as a feedback signal for controlling speed or commutation, the gain of the control loop will be a function of the rotor's angular velocity. In one embodiment, the feedback signal comprising the back emf is normalized with respect to angular velocity. In particular, the angular velocity, $\omega$, is presumed to be substantially the same as the commanded angular velocity, $\omega_C$, such that $\omega \approx \omega_C$. Accordingly, the normalized back emf or error signal becomes $$Verror = \frac{\text{Back } EMF}{\omega_c} = \frac{K_b \omega A \theta_r}{\omega_c} = K_b A \theta_r$$

such that the error voltage is proportional only to the positional error of the rotor.

Figure 6:
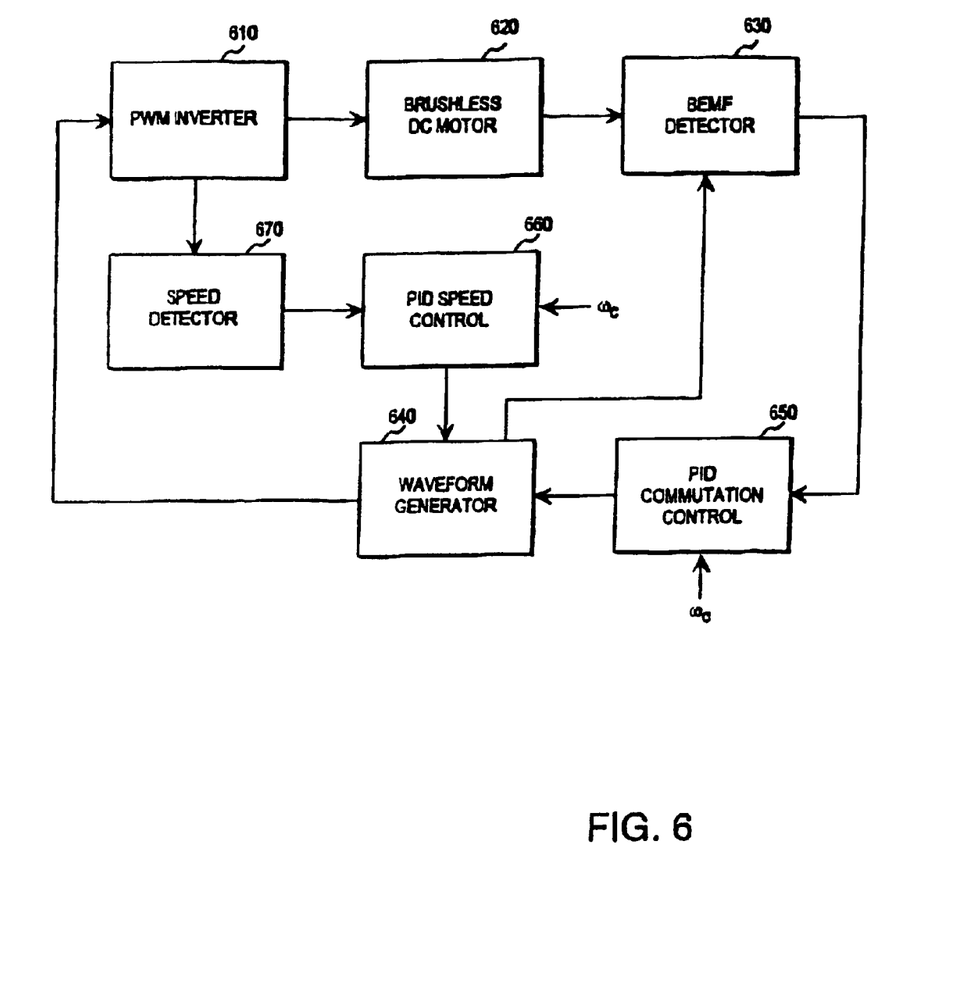
FIG. 6 illustrates one embodiment of a speed and a commutation control loop for a brushless DC motor.

FIG. 6 illustrates one embodiment of a brushless DC motor control system. Pulse width modulated (PWM) inverter 610 provides the actual drive voltage for brushless DC motor 620 in accordance with modulation control provided by waveform generator 640. Preferably the drive voltage has a waveform substantially similar to that of the back emf. In one embodiment the drive voltage provided by PWM inverter 610 is substantially sinusoidal. Waveform generator 640 generates the appropriate control waveform for each phase of the brushless DC motor 620. For an n phase brushless DC motor, the waveform generator provides n waveforms having electrical phase displacements of $$\frac{2\pi}{n}$$

with respect to each other.

In one embodiment, commutation and speed control are accomplished through proportional-integral-derivative (PID) feedback. In various embodiments, other combinations of feedback control such as PI are used.

PID commutation control 650 controls the frequency of waveform generator 640 in accordance with the rotor's positional error $\theta_r$. As stated above, the error signal provided by detector 630 is proportional to $\theta_r$. Elements 640, 610, 620, 630, and 650 form the commutation control loop.

Speed detector 670 measures the frequency of the drive voltage provided by PWM inverter 610 to determine the angular velocity or speed, $\omega$, of the rotor. In one embodiment, motor speed is controlled by a PID control loop. The detected rotor velocity is provided to PID speed control 660.

The amplitude of the drive voltage provided by PWM inverter 610 varies in accordance with the speed control signal provided to waveform generator 640 by speed control 660. PID speed control 660 generates waveform generator control signals to ensure the measured rotor speed corresponds to the commanded angular velocity, $\omega_C$. For a ventricular assist application, $\omega_C$ is determined by physiological demands. Waveform generator 640, PWM inverter 610, speed detector 670, and PID speed control 660 form the motor speed control loop. In alternative embodiments, other feedback control such as PI control may be used.

Brushless DC motor 620 generates a back emf that is detected by detector 630. Detector 630 open-circuits a selected phase when the corresponding drive voltage for that phase is substantially zero. In one embodiment, detector 630 determines when to initiate the sampling interval for a selected phase. In an alternative embodiment waveform generator 640 provides the trigger signal to detector 630.

The detected back emf is provided to PID commutation control for controlling the frequency of the drive voltage. The detected back emf is proportional to the rotor's positional error, $\theta_r$. In one embodiment, the detected back emf is not scaled by the commanded angular velocity, $\omega_C$. In an alternative embodiment, PID commutation control 650 scales the detected back emf by $\omega_C$ to produce a normalized back emf such that the resulting value is presumed to be proportional to the positional error of the rotor and substantially independent of the actual rotor angular velocity.

PID commutation control 650 provides a commutation control signal to waveform generator 640. In response to the commutation control signal, waveform generator varies the frequency of the drive voltage provided by PWM inverter 610. The commutation control loop is formed by waveform generator 640, PWM inverter 610, brushless DC motor 620, back emf detector 630 and commutation control 650. In alternative embodiments, other feedback control such as PI control may be used.

In one embodiment, the waveform generator provides the appropriate modulation control signals to PWM inverter 610 such that the drive voltage produced by the inverter has substantially the same waveform shape as the back emf generated by motor 620. In one embodiment, the drive voltage is substantially sinusoidal. In an alternative embodiment, the drive voltage is substantially trapezoidal.

Figure 7:
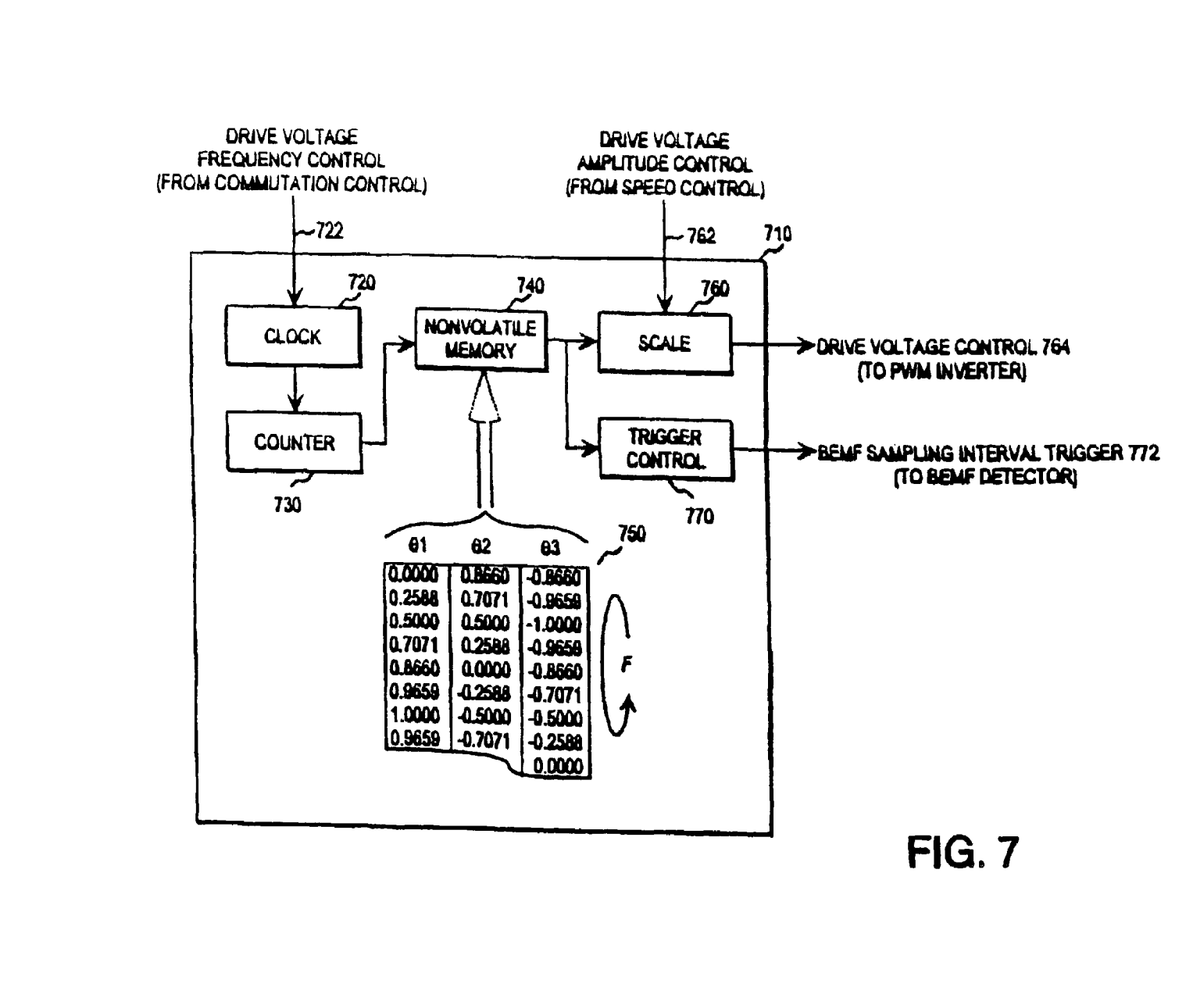
FIG. 7 illustrates one embodiment of a waveform generator.

FIG. 7 illustrates one embodiment of the waveform generator 710 using a table 750 of waveform values. Clock 720 provides a clock signal to counter 730. The frequency of the clock signal varies in accordance with the commutation control signal 722. Counter 730 provides sequential addresses for accessing a table 750 stored in nonvolatile memory 740. Table 750 stores waveform values for each phase of the drive voltage. When counter 730 wraps around, nonvolatile memory 740 continues to retrieve addresses from the top of table 750. The frequency at which the table 750 is cycled through (i.e., sweep rate) corresponds to the frequency of the drive voltage. The frequency, F, at which the table is cycled through is controlled by drive voltage frequency control 722. Reducing the sweep rate reduces the motor's speed. Similarly, increasing the sweep rate increases the motor's speed.

In one embodiment, nonvolatile memory 740 is programmable to enable updating table 750 for a particular motor or patient. For example, nonvolatile memory 740 may comprise re-writable flash memory.

The output of nonvolatile memory 740 is provided to a scale 760 and trigger control 770. The amplitude of the looked up waveform values is scaled in accordance with the speed control signal 762 to provide the drive voltage control 764. Drive voltage control 764 serves as tho control for the PWM inverter. Alternatively, the speed control signal 762 may be used to directly control the D.C. bus voltage of the PWM inverter. Speed control signal 762 effectively varies the D.C. bus voltage of the PWM inverter to control the speed of motor 620.

Trigger control 770 provides the signal to the back emf detector for initiating the sampling interval. In one embodiment, trigger control 770 provides the initiation signal in response to a particular value or range of values retrieved from the lookup table 750 for a selected phase. In an alternative embodiment, table 750 includes additional entries indicating when the sampling interval should be initiated for a particular phase. In this latter embodiment, trigger control initiates the sampling interval for a selected phase when explicitly indicated by table 750. The back emf sampling interval trigger signal 772 is provided to the back emf detector.

In alternative embodiments, logic circuitry rather than lookup tables can be used for generating the drive voltages. Logic circuitry may be more appropriate for piecewise linear drive voltage waveforms such as a trapezoidal drive system.

Figure 8:
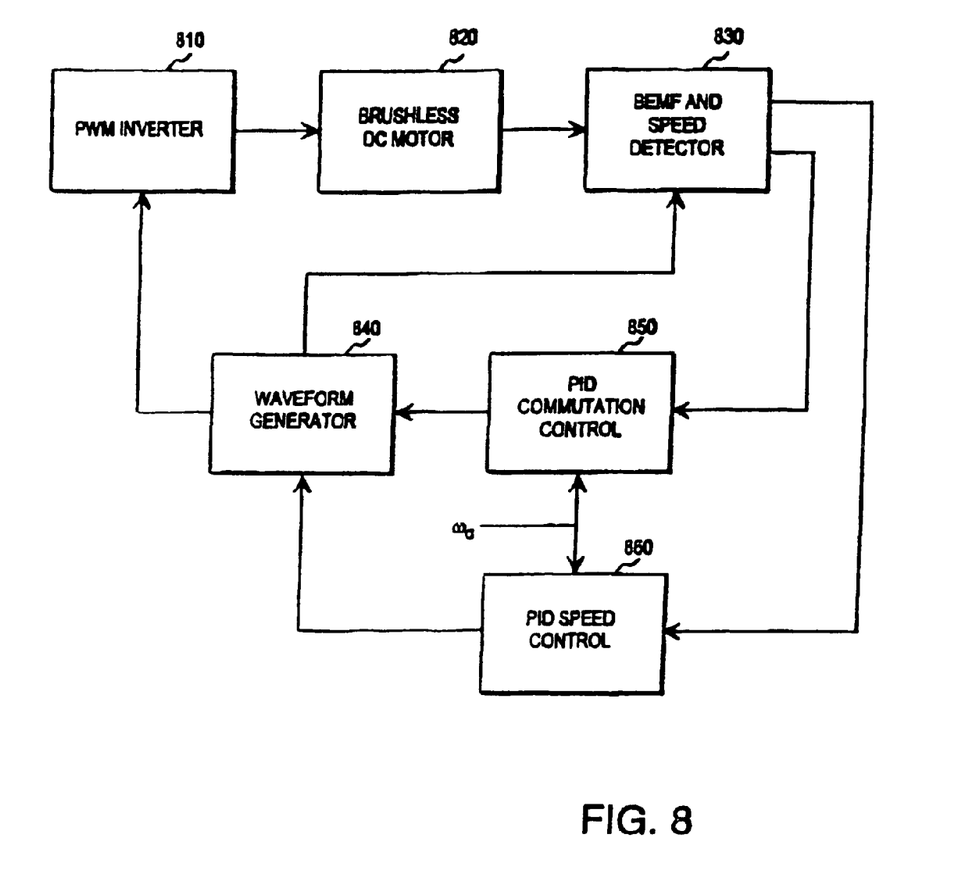
FIG. 8 illustrates an alternative embodiment of a speed and a commutation control loop for a brushless DC motor.

FIG. 8 illustrates an alternative embodiment of the motor control system in which the back emf rather than the drive voltage is used to infer the angular velocity of the rotor. Commutation control loop includes waveform generator 840, PWM inverter 810, motor 820, back emf and speed detector 830, and commutation control 850. Speed control loop includes waveform generator 840, PWM inverter 810, motor 820 back emf and speed detector 830, and speed control 860.

The back emf sampling interval for a given phase occurs while the drive voltage for that phase is substantially zero. The back emf, however, may not have a zero crossing during the sampling interval. In one embodiment, the zero crossing of the back emf is determined through interpolation, when the zero crossing does not occur during a sampling interval. Thus the zero crossing can be estimated based on the slope of the back emf and at least one value measured during the sampling interval. The back emf frequency can then be determined by the time between back emf zero crossings. The angular velocity or speed of the rotor can then be determined because the geometry of the motor and the frequency of the back emf are known.

Figure 9:
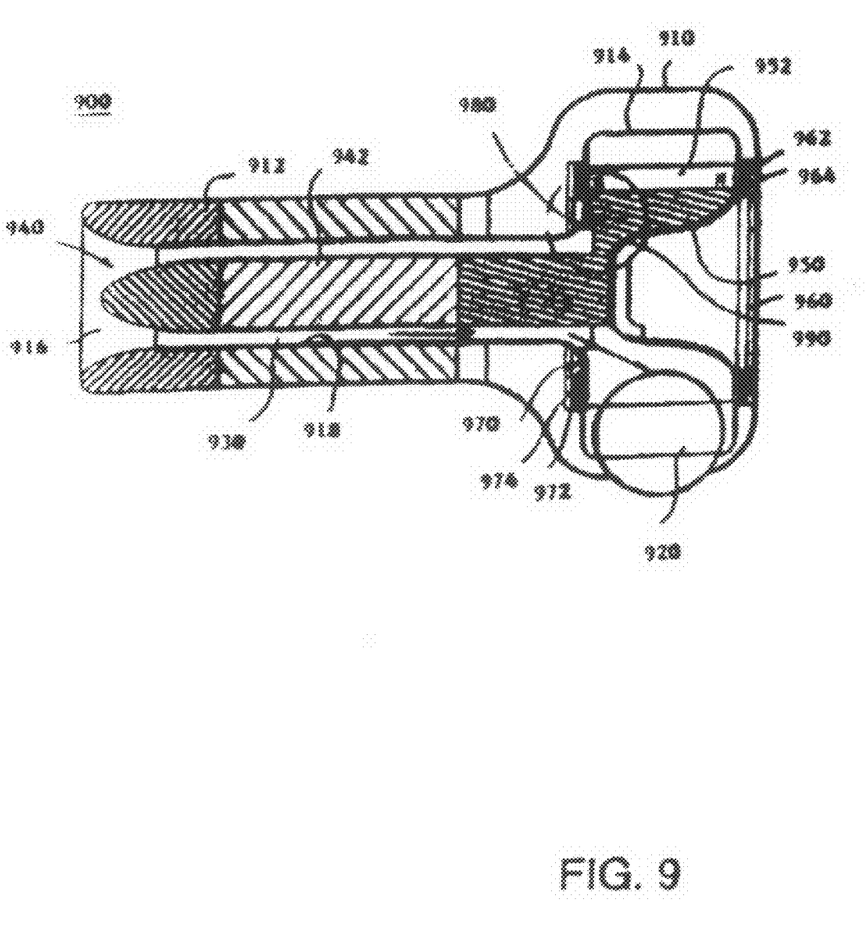
FIG. 9 illustrates one embodiment or an implantable ventricular assist device having a brushless DC motor.

FIG. 9 illustrates one embodiment of a ventricular assist device or blood pump 900. The blood pump is designed for implantable operation to assist a damaged or recovering heart with the circulation of blood. Reduction of mechanical vibration and acoustical emissions from the pump is important for the patient's quality of life.

Ventricular assist device 900 includes a housing 910 and an inlet tube 912 having an entry end 916 and an impeller volute 914. Discharge tube 920 extends through the housing to the interior periphery of volute 914 for channeling blood from impeller 950 of the pump. A blood flow path 930 exists between rotor 940 and the inner sidewalls 918 of inlet tube 916.

Rotor 940 rotates about a longitudinal axis extending through shaft 942 and impeller 950. Impeller 950 includes blades with the characteristic of being relatively thick in the axial direction. The impeller 950 includes permanent magnets 952.

A first motor stator 960 including motor windings 962 is located at the rear of impeller 950. A ring of back iron 964 is located behind windings 962. First motor stator 960 is fixed between housing 910 and volute 914. A second motor stator 970, comprising windings 972 is positioned at the front of impeller 950. Back iron 974 is positioned in front of windings 972. Second motor stator 970 is fixed to volute 914. The presence of a redundant stator enables continued motor operation in the event that one of the stators becomes defective. The defective stator is electrically disconnected from motor drive. The two stators may also be electrically connected to cooperate as a single stator.

Magnetic bearings (not shown) are provided for levitating rotor 940 and maintaining it in radial alignment with respect to its longitudinal axis. Hydrodynamic bearings 980 and 990 are provided to constrain axial motion and to provide radial support in case of eccentric motion or physical shock.

Housing 910, stators 960 and 970, and rotor 940 form a polyphase DC brushless motor. In one embodiment, the motor is a three phase motor. To reduce vibration, and acoustical and electrical noise, the motor is sinusoidally or trapezoidal driven using the back emf for commutation control in accordance with the method of FIG. 3.

Thus an implantable medical device including a brushless DC motor is described. The motor is provided with a drive voltage having a waveform substantially similar to the waveform of the back emf. In one embodiment, the drive voltage for the motor is sinusoidal. The back emf is sampled to provide commutation control for the motor. The back emf for each motor phase is sampled only when the drive voltage for that phase is substantially zero.

In the preceding derailed description the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An implantable blood pump comprising:
    a housing;
    a rotor;
    an impeller which comprises magnets;
    a first motor stator comprising windings located at the rear of the impeller;
    a second motor stator comprising windings positioned at the front of the impeller;
    the housing, the rotor and the first and second motor stators forming a polyphase DC brushless motor, wherein the motor is provided with a drive voltage such that back emf for each motor phase is sampled only when the drive voltage for that phase is substantially zero to provide commutation control for the motor.

2. The implantable blood pump of claim 1, wherein the drive voltage is substantially sinusoidal.

3. The implantable blood pump of claim 1, wherein the drive voltage is substantially trapezoidal.

4. The implantable blood pump of claim 1 further comprising:
    a commutation control providing a commutation control signal for a selected phase of the motor in accordance with a sampled back emf of that phase, wherein a frequency of a drive voltage of the brushless DC motor is varied in accordance with the commutation control signal.

5. The implantable blood pump of claim 1, wherein the sampled back emf is normalized with respect to a commanded angular velocity of a motor rotor.

6. The implantable blood pump of claim 1 further comprising: a speed control providing a speed control signal in accordance with a difference between a rotor angular velocity inferred from a frequency of the drive voltage and a commanded angular velocity, wherein an amplitude of the drive voltage is varied in accordance with the speed control signal.

7. The implantable blood pump of claim 1 further comprising:
    a speed control providing a speed control signal in accordance with difference between a rotor angular velocity inferred from a frequency of the back emf and a commanded angular velocity, wherein an amplitude of the drive voltage is varied in accordance with the speed control signal.

8. The implantable blood pump of claim 1 further comprising:
    a waveform generator providing a drive waveform to the inverter, wherein a frequency of the drive waveform varies in accordance with the commutation control signal, wherein the inverter provides the drive voltage at a same frequency as the drive waveform.

9. The implantable blood pump of claim 1, wherein the motor is a three phase brushless DC motor.

10. The implantable blood pump of claim 1, wherein the drive voltage of the selected phase passes through zero during sampling.

11. The implantable blood pump of claim 1, wherein the selected drive voltage does not pass through zero during sampling.

12. The implantable blood pump of claim 1, wherein the back emf for each motor phase is sampled by measuring an open-circuit voltage of the respective motor phase.

* * * * *